United States Patent [19]

Orr

[11] 4,103,867
[45] Aug. 1, 1978

[54] BALL VALVE

[76] Inventor: James Douglas Orr, 355 Rayette Rd., Concord, Ontario, Canada, L4K IBI

[21] Appl. No.: 765,874

[22] Filed: Feb. 4, 1977

[51] Int. Cl.² .............................................. F16K 25/04
[52] U.S. Cl. .................................. 251/180; 251/185; 251/315
[58] Field of Search ................ 251/185, 180, 174, 84, 251/315, 328

[56] References Cited

U.S. PATENT DOCUMENTS

| | | | |
|---|---|---|---|
| 3,161,204 | 12/1964 | Roy | 251/315 X |
| 3,231,235 | 1/1966 | Anderson | 251/315 X |
| 3,248,080 | 4/1966 | Plasko | 251/185 |
| 3,273,852 | 9/1966 | Ripert | 251/174 X |
| 3,425,663 | 2/1969 | Priese | 251/180 |
| 3,895,776 | 7/1975 | Laureus | 251/174 X |

Primary Examiner—Harold W. Weakley
Attorney, Agent, or Firm—Fetherstonhaugh & Co.

[57] ABSTRACT

A ball valve consisting of a housing having a spherical flow control ball located therein and a pair of tubular sealing members, one on each side of the flow control valve. The tubular sealing members having spherical seats seated in the through flow passage of the housing and sealingly engaging the flow control ball. The tubular sealing members have through passages which have axes inclined towards each other at an obtuse angle. The flow control ball is urged towards the tubular sealing members in a direction tending to increase the obtuse angle between the axes of the through passages of the sealing members whereby to maintain a sealing pressure between the flow control ball and the tubular sealing members.

4 Claims, 2 Drawing Figures

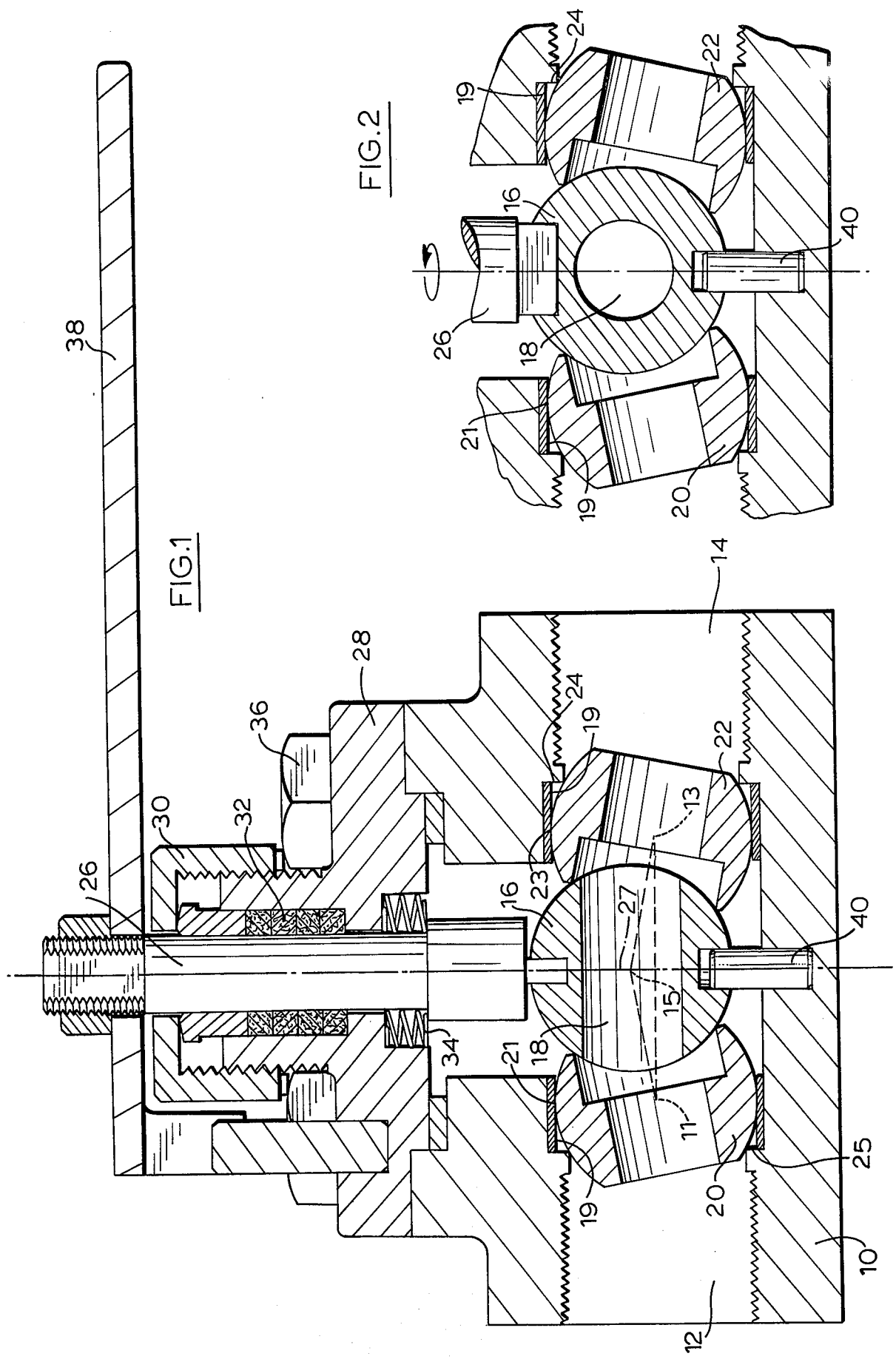

BALL VALVE

This invention relates to a ball valve for controlling the flow of fluids.

PRIOR ART

A prime purpose of the invention is to provide a valve that is fire-safe and has high temperature capabilities. The valve design is such that it can operate without the aid of elastic seats or the like. Ball valves of which I have knowledge employ plastic or rubber seals to provide an elastic pre-load between the ball and the seats. If one attempts to design a ball valve of known construction without elastic parts, the dimensional tolerances for the parts and for their assembly become impractical. Moreover, if accomplished, there is no ability in the assembly to take up wear and maintain a leak tight seal. This invention provides a fire-safe and high temperature resistant valve construction that does not require elastic seals and that overcomes the deficiencies of the prior valve constructions in these respects.

SUMMARY OF INVENTION

Generally speaking, a valve according to this invention comprises;

a housing; said housing being formed with a first through flow passage;

a spherical flow control ball in said housing;

said flow control ball being formed with a second through flow passage;

a pair of tubular sealing members, one on each side of said flow control ball, said tubular sealing member being located in said first through flow passage of said housing, a third through passage in each tubular sealing member;

each of said tubular sealing members having a first sealing surface at one end of said third through passage in sealing engagement with the surface of said flow control ball;

said tubular sealing members having a spherical seat seated in said first through flow passage of said housing;

said first through flow passage of said housing being round in cross-section and making a sealing contact with said spherical seat of said tubular sealing members;

the axes of said third through passages of said sealing members being inclined towards each other at an obtuse angle;

a stem connecting with said flow control ball and accessible exteriorly of said housing for rotating said flow control ball about the stem axis;

means urging said flow control ball in a direction tending to increase the obtuse angle between the axes of said sealing members whereby to maintain a sealing pressure between said flow control ball and said tubular sealing members.

The invention will be clearly understood after reference to the following detail specification read in conjunction with the drawings.

In the drawings,

FIG. 1 is a longitudinal sectional view of a valve according to an embodiment of the present invention, and FIG. 2 is a longitudinal sectional view of a portion of the valve of FIG. 1 showing the ball in the closed position.

In the drawings, the numeral 10 refers to a forged steel housing. It has a first through flow passage with an inlet port 12 and an outlet port 14. Flow through the housing is controlled by the spherical ball 16 which also has a second through flow passage 18. The spherical ball 16 has a centre of gyration at 15. A tubular lining sleeve 19 is located in each inner end of the flow passage 18, the sleeves 19 may be made from stainless steel or the like and serve to provide a smooth sealing surface for the ball 16.

Ball 16 makes a sealing engagement with one end of each of the tubular sealing members 20 and 22. Sealing members 20 and 22 in turn are seated on the side wall of the flow passage through the housing. The outer surfaces of the ball seats are spherical and they make a fluid tight interference sealing contact fit with the tubular lining sleeve 19 and the side wall of the through opening as at 21 and 23. Shoulders 24 on the through opening locate the sleeve 19 and the tubular sealing members with respect to the through opening. The tubular sealing members 20 and 22 have centres of gyration located at 11 and 13 respectively.

The ends of the ball sealing members 20 and 22 that engage with the ball engage with the marginal area around the through opening when the through opening is aligned with the opening of the casing to permit full flow as illustrated and serve to form a seal with the ball. The contact between the sealing members 20 and 22 and the ball 16 is preferably a line contact seal.

A stem 26 is carried by the stem mount 28 within which it is mounted for rotation about its longitudinal axis 27 and for movement in the axial direction of the longitudinal axis 27. A cap 30 on the stem mount holds the stem packing 32 in the stem mount. A spring 34 is compressed to exert a force on the shoulder of the stem with which it engages to urge the stem downwardly against the ball 16.

It will be noted that the axis of the through passages of the tubular members 20 and 22 incline towards each other at an obtuse angle and that because of the interengagement of the ball 16 and tubular members, a downward force in the ball will tend to rotate each of the tubular members about the centres of its spherical surface to increase the size of the obtuse angle and tighten the line contact seal between the ball and the tubular members.

The strength of the spring is designed to maintain an effective sealing relationship between the ball and the tubular sealing members. With this arrangement, wear at the sealing engagement between ball and tubular members is automatically compensated for by the spring.

The stem mount 28 is secured to the housing by bolts 36 and is rotatable by manipulation of the handle 38.

A round guide pin 40 is mounted on the bottom of the housing and enters a bore in the bottom of the ball 16 to ensure alignment as the ball is rotated in use.

It will be noted that the flow control ball 16 is not required to achieve a seal between the sealing members 20 and 22 and the casing 10. The seal between these members is a line contact achieved as at 21 and 23. The shoulders 24 and 25 are locating shoulders and not required as a seal.

The tightness of the seal between the flow control ball 16 and the tubular members 20 and 19 is achieved by the force of spring 34 as it forces the stem 26 axially of itself to depress the flow control ball 16 and reduce the size of the obtuse angle formed by the intersection of the axis of the sealing members. The strength of the spring 34 is adjusted to achieve the appropriate sealing pressure between the sealing members and the flow control valve. It will be apparent that as wear takes place that it will be compensated for by the pressure of the spring. Moreover, under conditions of extreme heat, expansion of the parts will take place and the ball 16 is free to back up and increase the obtuse angle between the axis of the sealing members against the spring pressure. Thus wear and extreme temperature are automatically compensated for by the spring 34.

The flow control ball 16 and the sealing members 20 and 22 are each preferably made of metal to withstand high temperatures. It will however, be understood that the component may be made from any suitable material such as carbon or the like. The contact between the flow control ball and the sealing members is preferably a line contact.

The use of the valve is similar to any other ball valve by manually rotating stem 26 by means of handle 38, one rotates the ball 16 from the position illustrated in FIG. 2 wherein full flow is achieved to a position 90° therefrom where the through opening in the ball 16 is not aligned with the openings in the sealing members 20 and 22 to block flow through the valve. Intermediate positions where partial flow is achieved, are possible.

In the embodiment of the invention illustrated in the drawings, the housing is made of a steel forging. The flow control ball 16 and the sealing members 20 and 22 are machined from stainless steel or bronze balls, the stem is made from stainless steel and the packing and seals and other components are of standard valve materials.

It will be apparent from the drawings that an effective seal can be maintained between the ball 16 and the sealing members 20 and 22 as long as the distance from the centre of gyration 11,13 to the centre of gyration 15 is greater than the distance from centre 11,13 to longitudinal centre line 27.

Embodiments of the invention other than the one illustrated will be apparent to those in the art. By way of example of modification, it will be noted that one may use means other than the spring 34 for urging the ball 16 in a downward direction to take up the toleration between the flow control ball and the sealing members. For example, one might have some kind of a vertical adjustment of the stem that could be adjusted exteriorly of the valve with a manual setting. The spring is preferred, but it is not the only means intended for exerting a downward pressure on the ball 16 to achieve the seal between the flow control ball and the sealing members. Furthermore, the tubular sealing members 20 and 22 need not be entirely spherical. They may be cylindrical with a spherical seat portion formed as a collar on the exterior surface thereof for engagement with the valve housing.

What I claim as my invention is:

1. A valve comprising:
   a housing having a flow passage;
   a spherical flow control ball having a flow passage;
   a pair of tubular sealing members each having a flow passage and a spherical outer wall;
   the spherical outer wall of said tubular sealing members being seated in said flow passage of said housing for rotational movement about the centres of their respective spherical surfaces and with their flow passages generally aligned with the flow passage of the housing;
   said control ball being between said tubular sealing members and having its surface in sealing engagement with an end of the passage of each sealing member;
   means for maintaining said control ball and sealing members in spaced relation longitudinally of the flow passage of the housing with the centers of the control ball and centers of the sealing members in triangular relation, the centers of said spherical surfaces of said sealing members being below the center of said control ball whereby a downward force on said control ball and through its center causes a rotational force on said sealing members and tightens the engagement of the ends of the passages of the sealing members with the spherical surface of said ball;
   a stem keyed to said control ball and extending exteriorly of said housing that is rotatable to align or disalign the flow passage of the control ball with the flow passage of the housing and sealing members to control flow; and
   means for maintaining a downward force on said control ball through its center to maintain a rotational force on said sealing members and maintain them in sealing contact with said control ball.

2. A valve as claimed in claim 1 wherein said sealing engagement between said control ball and an end of the passage of each of the sealing members is a line contact.

3. A valve as claimed in claim 1 wherein said flow control ball and said tubular sealing members and said casing are each made of metal.

4. A valve as claimed in claim 1 wherein said sealing engagement between said control ball and an end of the passage of each of the sealing members is a line contact and wherein said flow control ball and said tubular sealing members and said casing are each made of metal.

* * * * *